United States Patent [19]

Kobayashi et al.

[11] Patent Number: 4,644,490
[45] Date of Patent: Feb. 17, 1987

[54] FLOATING POINT DATA ADDER

[75] Inventors: Takao Kobayashi, Hitachi; Shigeo Abe, Katsuta; Tadaaki Bandoh, Ibaraki; Masao Takatoo, Katsuta; Hidekazu Matsumoto; Hideyuki Hara, both of Hitachi, all of Japan

[73] Assignees: Hitachi, Ltd., Tokyo; Hitachi Engineering Co., Ltd., Ibaraki, both of Japan

[21] Appl. No.: 599,167

[22] Filed: Apr. 11, 1984

[30] Foreign Application Priority Data

Apr. 11, 1983 [JP] Japan .................. 58-62294

[51] Int. Cl.⁴ .............................................. G06F 7/50
[52] U.S. Cl. ............................................... 364/748
[58] Field of Search ......................................... 364/748

[56] References Cited

U.S. PATENT DOCUMENTS 3,551,665 12/1970 Powers et al. ............... 364/748
3,697,734 10/1972 Booth et al. ................ 364/748
4,075,704 2/1978 O'Leary ..................... 364/748
4,229,801 10/1980 Whipple ..................... 364/748
4,562,553 12/1985 Mattedi et al. .............. 364/748

OTHER PUBLICATIONS

Covert et al, "Floating-Point Adder Chip Fills Digital-Processing Gap" *Electronic Design*, vol. 29, No. 24, Nov. 26, 1981, pp. 187-192.

*Primary Examiner*—David H. Malzahn
*Attorney, Agent, or Firm*—Antonelli, Terry & Wands

[57] ABSTRACT

A pipelined adder for adding or subtracting two floating point input data each expressed by a sign data, an exponent data and a mantissa expressed in a sign-magnitude format, in accordance with an external operation mode designation signal to produce a floating point sum or difference data in a sign-magnitude format. In a first stage of the adder, the magnitudes of the exponent data of the input data are compared by a subtractor or a comparator and the magnitudes of the mantissa data of the input data are compared by a subtractor or a comparator. An actual operation mode for the mantissa data of the input data is determined, on the basis of the compare results of the exponent data and the mantissa data and the external operation mode designation signals, so that the operation result data is always expressed in a sign-magnitude format.

10 Claims, 6 Drawing Figures

FLOATING POINT DATA ADDER

BACKGROUND OF THE INVENTION

The present invention relates to a floating point data adder for adding and subtracting two floating point input data having mantissas thereof expressed in a sign-magnitude format, and more particularly to a floating point data adder which produces a sum or difference of mantissas of two data in an expression of a sign-magnitude format.

In a floating point data adder with input data having mantissas thereof expressed in a sign-magnitude format, an addition/subtraction mode of the mantissa data is specified only by signs of the input data and a specified operation mode. Accordingly, an operation result of the mantissa data may become negative in a one's or two's-complement format, and in such a case the result must be converted to a sign-magnitude format. Accordingly, when such adders are configured in a pipeline, the number of pipeline stages is larger than that of a one's or two's-complement pipelined floating point data adder as shown in U.S. Pat. No. 4,075,704. In other words, an additional stage is required to express the mantissa data by the sign-magnitude format after the arithmetic operation. As a result, it is inevitable that the performance of the scalar operation is deteriorated by an overhead due to the additional stage.

SUMMARY OF THE INVENTION

It is an object of the present invention to provide a sign-magnitude floating point data adder without deteriorating an operation performance and without requiring conversion to a sign-magnitude format after the operation of the mantissa data.

In order to achieve the above object, in accordance with the present invention, magnitudes of mantissa data of two input data are previously compared so that a subtraction operation is carried out by subtracting the smaller mantissa data from the larger mantissa data to assure that an operation result of the mantissa data is always produced in a sign-magnitude format.

DESCRIPTION OF THE PREFERRED EMBODIMENTS

Preferred embodiments of the present invention will now be described with reference to FIGS. 1 to 6.

Figure 1:
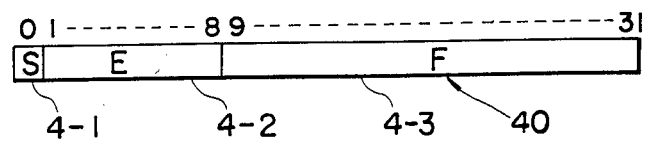
FIG. 1 shows a format of an IEEE standard single precision floating point data.

A format of a floating point data in the present invention is first explained. FIG. 1 shows a single precision data in an IEEE standard floating point data 40. It comprises 32 bit in total a sign of the floating point data is represented by a sign data (S) field (1 bit) 4-1, an exponent data (E) is represented by an exponent field (8 bits) 4-2, and a mantissa data (F) is represented by a mantissa field (23 bits) 4-3, by binary notations. When the data is positive (including 0), the sign bit S is "0", and when the data is negative, the sign bit S is "1". The exponent data E is represented by Ea+B where Ea is an actual exponent and B is an exponent correction value (constant bias value). Since the mantissa is always normalized to an expression of [1.---], the leading bit "1" is omitted in the mantissa data 4-3. Thus, when the mantissa data is F (for example, [101100 ---]) as shown in FIG.1, and actual mantissa is 1.F (for example, [1.101100--]). Accordingly, the value of the data expressed by the format 40 is $[(-1)^S \times 2^{E-B} \times (1.F)]$. In the present specification, both F and 1.F are referred to as the mantissa data.

Figure 2:
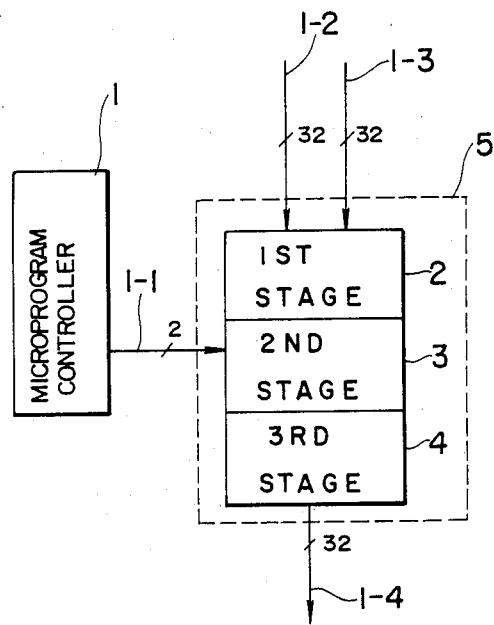
FIG. 2 shows a configuration of a pipelined floating point data adder.

FIG. 2 shows a pipelined floating point data adder of the present invention together with a microprogram controller. In a pipelined adder 5, an adder left input floating point data 1-2 and an adder right input floating point data 1-3 are sequentially processed in a first stage 2, a second stage 3 and a third stage 4 under a control of an operation mode designation signal 1-1 from a microprogram controller 1. A sum of or difference 1-4 of those input data is produced in the same format as those of the input data shown in FIG. 1.

Figure 3:
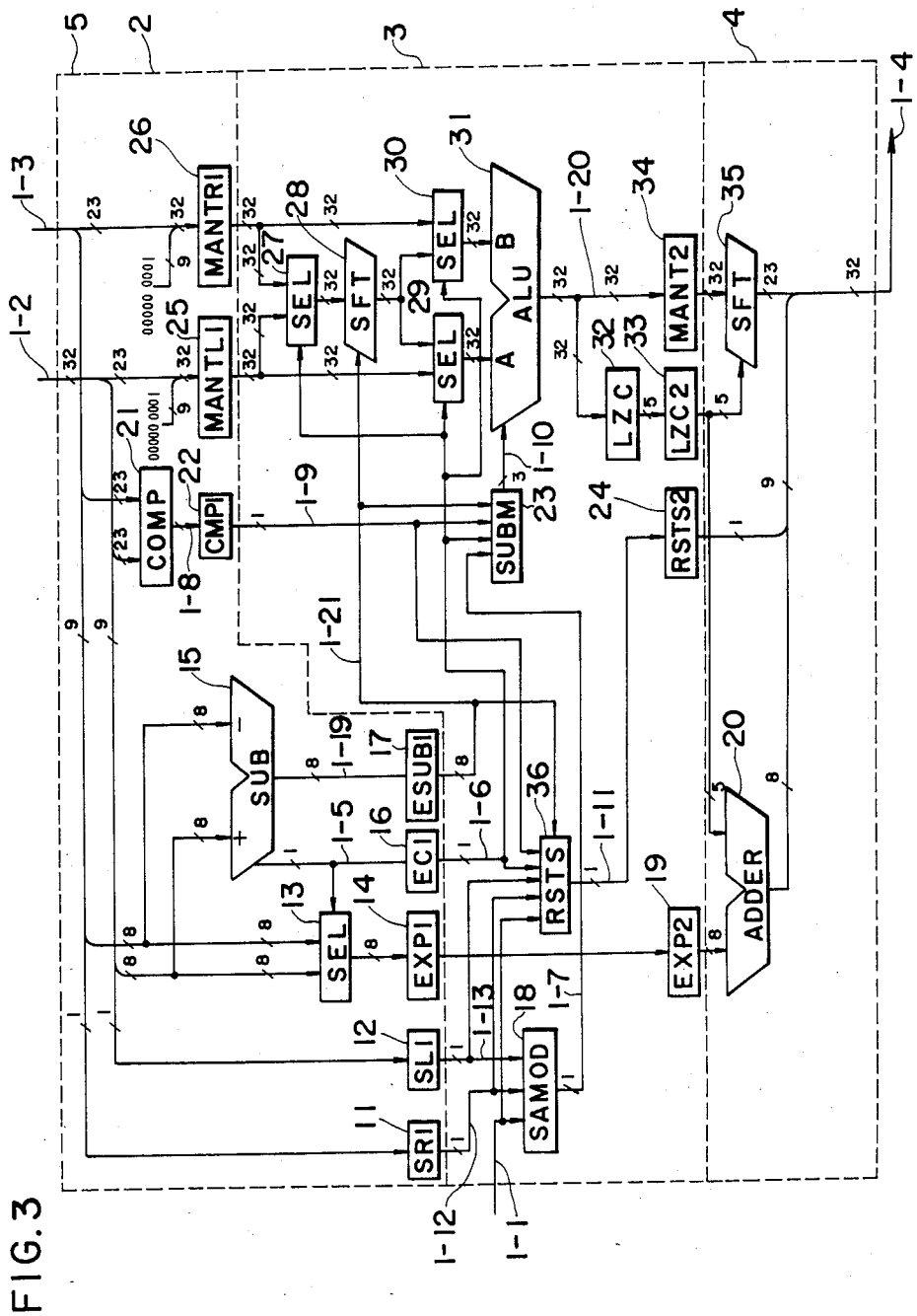
FIG. 3 shows an overall configuration of a pipelined floating point data adder in accordance with the present invention.

Embodiments of the present invention will be specifically explained in conjunction with FIGS. 3 to 6. FIG. 3 shows an overall configuration of the pipelined floating point data adder of the present invention. Blocks 2, 3 and 4 of FIG. 3 correspond to the first, second and third stages 2, 3 and 4 of FIG. 2, respectively. In the first stage 2, the sign (S) data are extracted from the adder left input floating point data 1-2 and the adder right input floating point data 1-3, the mantissa (F) data are extracted and compared, and the exponent (E) data are extracted and compared. The 1-bit sign data contained in the parallelly transferred input data 1-2 and 1-3 are loaded in registers 12 and 11, respectively, and the 23-bit mantissa data are loaded to 32-bit registers 25 and 26, respectively. The mantissa data are loaded in a form of 1.F. That is, the mantissa data are restored to the inherent mantissa form. The mantissa data of the input data 1-2 and 1-3 are compared by a comparator 21 and a compare result of those data is loaded in a register 22 and is subsequently utilized in a manner to be described later. The 8-bit exponent data extracted from the input data 1-2 and 1-3 are supplied to a subtractor 15 where a magnitude compare result and an exponent difference are calculated. The magnitude compare result 1-5 and the exponent difference (in absolute value or 2's complement) 1-19 are loaded in registers 16 and 17, respectively. The larger exponent data is loaded in a register 14 through a selector 13 under a control of the magnitude compare result 1-5. The larger exponent data loaded in the register 14 is used to prepare an operation result output data in the stage 3 to be described later.

The operation in the second stage 3 is now explained. In the stage 3, the discrimination of the addition/subtraction mode, the discrimination of the sign of the operation result, the discrimination of the operation mode and the operation of the mantissa are carried out. As will be specifically shown later, an addition/subtraction mode discriminator 18 produces an addition/subtraction mode signal 1-7 based on sign data 1-12 and 1-13 from the registers 11 and 12 and the operation (addition/subtraction) mode designation signal 1-1 from the microprogram controller 1. For example, when one of the input data is negative and the operation mode designation signal 1-1 designates the addition, the addition/subtraction mode signal 1-7 results in the subtraction mode signal. The sign of the output data 1-4 which is the final operation result is determined by the sign data 1-12 and 1-13, the operation mode designation signal 1-1, the exponent data magnitude compare result 1-6, the exponent difference 1-21 and the mantissa data magnitude compare result 1-9. The final operation result sign 1-11 is produced by an operation result sign discriminator 36 and loaded in a register 24, a specific configuration of the operation result sign discriminator 36 is described later. The operation mode carried out in the operation unit 31 is determined by an operation mode discriminator 23. The operation mode signal 1-10 is produced by the operation mode discriminator 23 based on the addition/subtraction mode signal 1-7, the exponent data magnitude compare result 1-6, the mantissa data magnitude compare result 1-9 and the exponent difference 1-21 to specify the operation to be carried out in the operation unit 31 for the two mantissa data. When the operation mode signal 1-10 designates the addition, the addition is carried out by the operation unit 31 for the two mantissa data (magnitude values) matched for the decimal point, and when the subtraction is designated, the subtraction is carried out such that the smaller one of the two mantissa data is subtracted from the larger one. Thus, the mantissa data of the difference is always expressed by the magnitude value. A specific configuration of the operation mode discriminator 23 will be explained later. The mantissa data are operated in the operation unit 31 in the following manner.

The mantissa data from the registers 25 and 26 are first matched for the decimal point. The register 16 outputs the exponent data magnitude compare result 1-6. The mantissa data of the smaller input data is selected by the selector 27 and it is shifted right in a shifter 28 by a number of positions corresponding to the exponent difference 1-21 supplied from the register 17 to match the decimal point. For example, when the input data 1-2 has the exponent data of [00000101] and the mantissa data of [1.101100 ---], and the input data 1-3 has the exponent data of [00000010] and the mantissa data of [1.011100 ---], the mantissa data of the input data 1-3 is shifted right by three positions to produce [0.001011100 ---]. The mantissa data of the input data having the larger exponent data and the mantissa data matched thereto are operated by the operation unit 31 through the selectors 29 and 30 controlled by the exponent data magnitude compare result 1-6. The operation to be carried out is designated by the operation mode discriminator 23. When the operation mode signal 1-10 designates the addition, the operation unit 31 carries out the operation $FD_L + FD_R$, and when the signal 1-10 designates the subtraction, it carried out the operation $FD_L - FD_R$ (when $FD_L \geq FD_R$) or $FD_R - FD_L$ (when $FD_R \geq FD_L$), where $FD_L$ is the mantissa data to the left input of the operation unit 31 and $FD_R$ is mantissa data to the right input. Accordingly, the mantissa data operation result 1-20 is always produced in the magnitude value. The mantissa data operation result 1-20 is loaded in the register 34 and the direction of the shift and the number of shift positions to normalize the mantissa data operation result 1-20 are determined by a normalization shift detector 32. For example, when the mantissa data operation result 1-20 is [0.0101 ---], it is shifted left by two bit positions to normalize it is [1.01 ---], and when the mantissa data operation result 1-20 is [11.101 ---], it is shifted right by one bit position to normalize it to [1.1101 ---]. The number of shift positions including the shift direction information for the normalization is loaded in the register 33, and based on the number of shift positions, the exponent data is corrected and the mantissa data operation result is normalized in the third stage 4.

In the third stage 4, the mantissa data operation result from the register 34 is shifted right by one bit position or shifted left by the number of bits corresponding to the detected number of shifts, in the shifter 35 under the control of the normalization shift detector 32. When the mantissa data operation result is in the form of [1.01 ---], no shift is required. On the other hand, the larger exponent data is loaded in the register 19 in the second stage 3. This exponent data is to be corrected by adding thereto the number of shifts from the register 33 in the adder unit 20. When the mantissa data operation result is to be shifted right, one is added to the exponent data, and when it is to be shifted left, the number of shifts is subtracted from the exponent data. Accordingly, the sum/difference 1-4 for the input data 1-2 and 1-3 is readily obtained by arranging the outputs of the register 24, the adder unit 20 and the shifter 35 in the format shown in FIG. 1.

Figure 4:
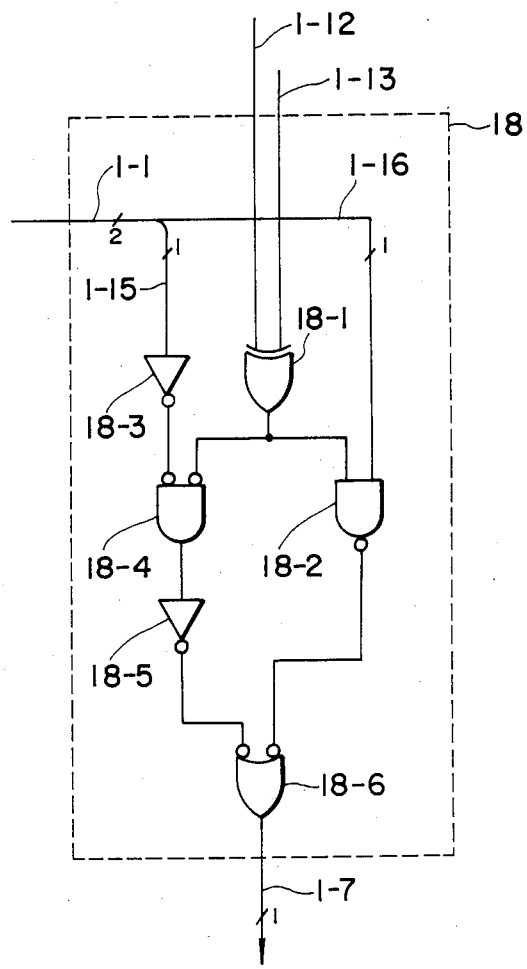
FIG. 4 shows an embodiment of an addition/subtraction mode discriminator.

FIG. 4 shows a specific configuration of the addition/subtraction mode discriminator 18. The subtraction mode is discriminated when the input data are of opposite signs and the external operation mode designation signal 1-1 designates the addition, and when the input data are of the same sign and the signal 1-1 designates the subtraction. An exclusive OR gate 18-1 detects whether the input data are of the opposite signs or the same sign, and two bits of the operation mode designation signal 1-1 designate the addition and the subtraction, respectively. In the former case, the signal 1-15 is "0" and the signal 1-16 is "1" and a NAND gate 18-2 detects it, and in the latter case, the signal 1-15 is "1" and the signal 1-16 is "0" and inverters 18-3 and 18-5 and a NOR gate 18-4 detect it. The detected outputs are ORed by a NAND gate 18-6 so that the addition-/subtraction mode signal 1-7 is produced. In the present embodiment, the addition mode is represented by "0" and the subtraction mode is represented by "1".

Figure 5:
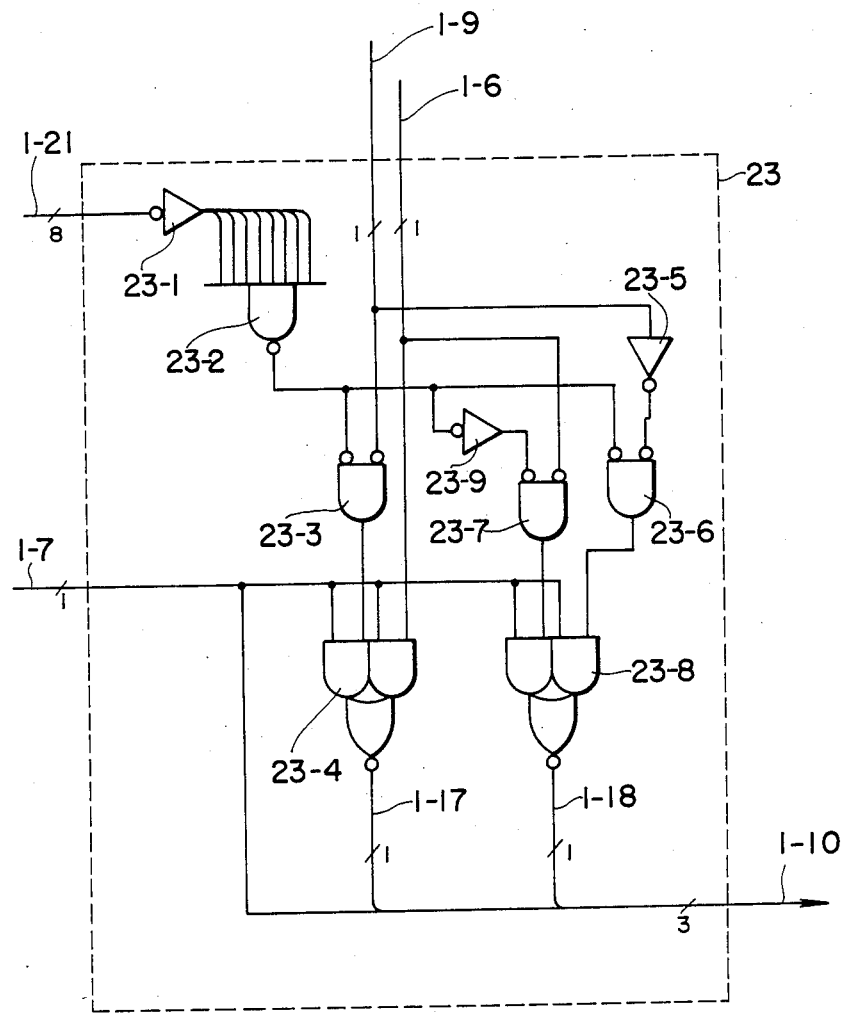
FIGS. 5 and 6 show embodiments of an operation mode discriminator and an operation result sign discriminator, respectively.

A specific configuration of the operation mode discriminator 23 is now explained. The function of the operation mode discriminator 23 is to designate to the operation unit an operation mode of the operation unit, such as the addition of the two mantissa data or the subtraction of the smaller mantissa data from the larger mantissa data. No problem arises for the addition but a problem arises for the subtraction because the subtraction should be carried out such that the mantissa data is always expressed by the magnitude value. FIG. 5 shows the specific configuration. When the addition/subtraction mode signal 1-7 designates the addition, it is outputted as the operation mode signal 1-10 which designates the addition. However, when the signal 1-7 designates the subtraction, the magnitudes of $FD_L$ and $FD_R$ are compared to determine which one of the subtractions $FD_L - FD_R$ and $FD_R - FD_L$ is to be carried out.

The subtraction $FD_R - FD_L$ is carried out when the exponent data are equal and the mantissa data magnitude compare result 1-9 from the register 22 indicates that the mantissa data of the input data 1-3 is larger than that of the input data 1-2, or the exponent data of the input data 1-3 is larger than that of the input data 1-2. The exponent difference 1-21 from the register 17 is supplied to a NAND gate 23-2 through an inverter 23-1 to check whether the exponent data are equal or not. When the mantissa data magnitude compare result 1-9 from the register 22 indicates that the mantissa data of the input data 1-3 is larger, it is indicated by an AND-OR-INVERT (A-O-I) gate 23-4 through a NOR gate 23-3. When the exponent data magnitude compare result 1-6 from the register 16 indicates that the exponent data of the input data 1-3 is larger, it is indicated by the A-O-I gate 23-4. Thus, the operation $FD_R - FD_L$ is carried out when the output of the A-O-I gate 23-4 is "0".

The operation $FD_L - FD_R$ is carried out when the exponent data are equal and the mantissa data magnitude compare result 1-9 from the register 22 indicates that the mantissa data of the input data 1-2 is larger than or equal to that of the input data 1-3, or the exponent data of the input data 1-2 is larger than that of the input data 1-3. An inverter 23-5 and a NOR gate 23-6 detect the former case, and an inverter 23-9 and a NOR gate 23-7 detect the latter case. When an output 1-18 of an A-O-I gate 23-8 is "0", the operation $FD_L - FD_R$ is carried out.

To summarize the above conditions, when the exponent data of the input data 1-2 and 1-3 are different, the operation $FD_R - FD_L$ or $FD_L - FD_R$ is selected in accordance with the exponent data magnitude compare result 1-6 irrespective of the mantissa data magnitude compare result 1-9. On the other hand, when the exponent data of the two input data are equal, the operation $FD_L - FD_R$ or $FD_R - FD_L$ is selected in accordance with the mantissa data magnitude compare result 1-9.

Figure 6:
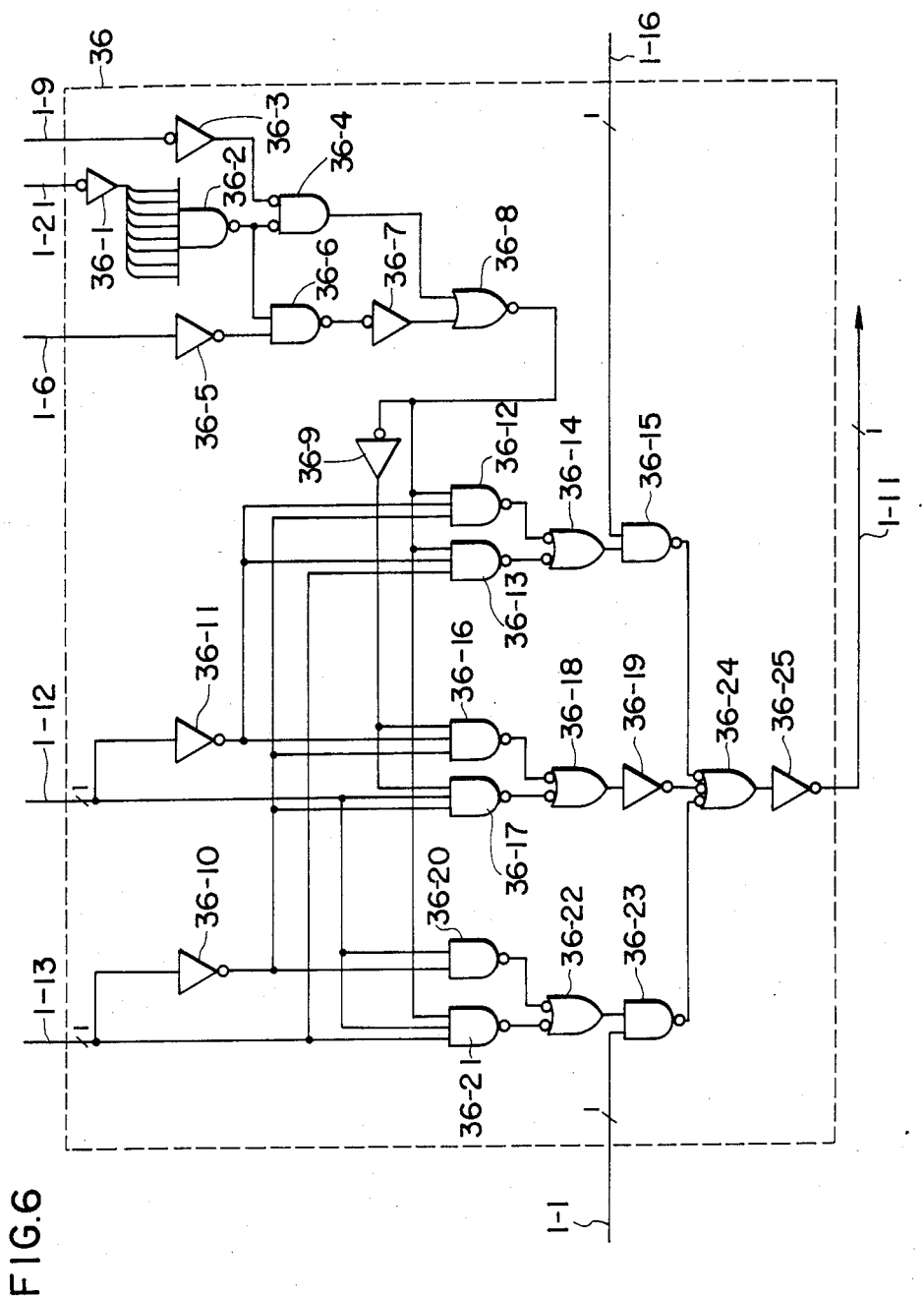

The configuration of the operation result sign discriminator 36 is shown in FIG. 6. The function of the operation result sign discriminator 36 is to determine the sign of the final operation result for the input data 1-2 and 1-3. The sign is determined by the magnitudes of the absolute values of the input data 1-2 and 1-3, the mode of the external operation mode designation signal 1-1 and the signs of the input data 1-2 and 1-3. A table shown below indicates the signs of the operation results in sixteen operation modes, where $S_L$ and $S_R$ indicate the signs of the input data 1-2 and 1-3, L and R indicate the absolute values of the input data 1-2 and 1-3, and an addition mode and a subtraction mode indicate the modes of the external operation mode designation signal 1-1.

|       |       |           | Sign of Operation Result |                  |
|-------|-------|-----------|--------------------------|------------------|
| $S_L$ | $S_R$ | L $\geq$ R | Addition Mode            | Subtraction Mode |
| +     | +     | 0         | +(1)                     | −(2)             |
| +     | +     | 1         | +(3)                     | +(4)             |
| +     | −     | 0         | −(5)                     | +(6)             |
| +     | −     | 1         | +(7)                     | +(8)             |
| −     | +     | 0         | +(9)                     | −(10)            |
| −     | +     | 1         | −(11)                    | −(12)            |
| −     | −     | 0         | −(13)                    | +(14)            |
| −     | −     | 1         | −(15)                    | −(16)            |

In the above table, when $L \geq R$ (true), it is shown by "1", and when $L < R$ (false), it is shown by "0".

The 8-bit exponent difference 1-21 is supplied to a NAND gate 36-2 through an inverter 36-1 so that the equality of the exponent data of the input data 1-2 and 1-3 is checked. When they are equal, an inverter 36-3 and a NOR gate 36-4 detects if the mantissa data of the input data 1-2 is larger than or equal to that of the input data 1-3. When the exponent data are not equal, inverters 36-5 and 36-7 and a NAND gate 36-6 detects if $L > R$ based on the exponent data magnitude compare result 1-6, and a NOR gate 36-8 produces "0" when $L \geq$ and "1" when $L < R$. Accordingly, considering the sign data 1-12 and 1-13 and the two-bit operation mode designation signal 1-1 (subtraction mode signal 1-15 and addition mode signal 1-16), the operation result is positive in the operation modes (1), (3), (4), (6), (7), (8), (9) and (14). The sign data 1-12 and 1-13 are inverted by inverters 36-11 and 36-10, respectively, and the output of the NOR gate 36-8 is inverted by an inverter 36-9. The operation modes (1) and (9) are detected by the NAND gates 36-12, 36-13, 36-14 and 36-15, the operation modes (3), (4), (7) and (8) are detected by the NAND gates 36-16, 36-17 and 36-18 and the inverter 36-19, and the operation modes (6) and (9) are detected by the NAND gates 36-20, 36-21, 36-22 and 36-23. The outputs of the NAND gates 36-15 and 36-23 and the inverter 36-19 are supplied to a NAND gate 36-24 and the output thereof is supplied to an inverter 36-25. Accordingly, the operation result sign 1-11 is "0" for positive and "1" for negative.

As described hereinabove, in accordance with the present invention, the mantissa data operation result is always obtained in the form of the magnitude value. Therefore, when the adder is configured in the pipeline, the number of stages does not increase and the operation performance for the scalar operation is not deteriorated.

In the above embodiment, the mantissa data of the input data are compared in the first stage in parallel to the comparison of the exponent data. Alternatively, the mantissa data may be compared in the second stage in parallel to the shifting of the mantissa data.

What is claimed is:

1. An adder for adding and subtracting two floating point input data each consisting of a sign data, an exponent data and a mantissa data expressed in a sign-magnitude format, in accordance with an external operation mode designation signal to produce a floating point sum or difference data in a sign-magnitude format, comprising:

first means for comparing the magnitudes of the mantissa data of the input data;

second means for comparing the magnitudes of the mantissa data of the input data;

shift means for shifting the mantissa data of one of the input data to match the magnitudes of the mantissa data between the input data based on the exponent difference calculated by said first means when the exponent data of the input data are not equal;

addition/subtraction means for subtracting the smaller mantissa data from the larger mantissa data of the other input data and the mantissa data from said shift means, on the basis of the discrimination results by said first and second means, the sign data of the input data and the external operation mode designation signal, when an actual operation mode for the mantissa data is a subtraction mode;

means for producing a sign data of the floating point sum or difference data, based on the discrimination results by said first and second means, the sign data of the input data and the external operation mode designation signal; and means for normalizing the mantissa data produced by said addition/subtraction means and combining the normalized mantissa data with the exponent data of said other input data and the sign data from said sign data producing means to produce the floating point operation result data.

2. An adder according to claim 1 wherein said shift means includes means for shifting the mantissa data of said one input data by a number of bit positions corresponding to the exponent difference calculated by said first means.

3. An adder according to claim 2 wherein said addition/subtraction means includes:
means for determining the actual operation mode for the mantissa data of other said input data and the mantissa data from said shift means, on the basis of the discrimination results by said first and second means, the sign data of the input data and the external operation mode designation signal;
an operation unit for performing an arithmetic operation on the input mantissa data in accordance with the discrimination result by said actual operation mode determining means and producing the operation result mantissa data expressed in the sign-magnitude format; and
selector means inserted between said shift means and said operation unit for selecting the input to said operation unit from the mantissa data of said other input data and the mantissa data from said shift means.

4. An adder according to claim 1 wherein said adder is configured in a pipeline including:
a first stage including at least said first means;
a second stage including at least said shift means, said addition/subtraction means and said sign data producing means; and
a third stage including at least said normalizing means.

5. An adder according to claim 4 wherein said second means is included in said first stage.

6. A floating point data adder for adding and subtracting two floating point input data each consisting of a sign data, an exponent data and a mantissa data expressed in a sign-magnitude format, in accordance with an external operation mode designation signal to produce a floating point sum or difference data in a sign-magnitude format, comprising:
first means for calculating a difference between the exponent data, comparing the magnitudes of the exponent data and selecting the larger exponent data, based on the compare result;
second means for comparing the magnitudes of the mantissa data;
third and fourth means for determining an actual operation mode for the mantissa data and a final operation result sign data, respectively, on the basis of the external operation mode designation signal, the sign data of the input data, the exponent data magnitude compare result, the exponent difference and the mantissa data magnitude compare result;
fifth means for shifting the mantissa data for the smaller exponent data to match the mantissa thereof to that of the mantissa data for the larger exponent data, based on the exponent data magnitude compare result and the exponent difference, performing an arithmetic operation on the mantissa data in accordance with the determined operation mode, and detecting the number of shift positions and a direction of shift for normalization from an operation result; and
sixth and seventh means for correcting the selected larger exponent data and the mantissa data operation result, respectively, in accordance with the number of shift positions and the direction of shift for the normalization.

7. A floating point data adder according to claim 6 wherein said adder is configured in a pipeline including a first stage including at least said first means, a second stage including at least said third, fourth and fifth means, and a third stage including at least said sixth and seventh means, and temporary data storage means are included at the output positions of said first and second stages.

8. A floating point data adder according to claim 7 wherein said second means is included in said first stage.

9. An adder for adding and subtracting two floating point input data each consisting of a sign data, an exponent data and a mantissa data expressed in a sign-magnitude format, in accordance with an external operation mode designation signal to produce a floating point sum or difference data in a sign-magnitude format, comprising:
means for comparing magnitudes of the mantissa data of the two floating point input data;
adjusting means for matching the exponent data of the smaller input data to the exponent data of the larger input data and shifting the mantissa data of the smaller input data, accordingly on the basis of the compare result of said compare means;
operation means for subtracting the smaller mantissa data from the larger mantissa data, of the mantissa data of the larger input data and the matched input data, on the basis of the external operation mode designation signal and the sign data of the input data when the subtraction is to be carried out for the mantissa data; and
means for shifting the mantissa data of the operation result produced by said operation means to normalize the floating point operation result data.

10. An adder according to claim 9 wherein said adder is configured in a pipeline including:
a first stage includwng at least said compare means;
a second stage including at least said adjusting means, and said operation means; and
a third stage including at least said operation result data producing means.

* * * * *